United States Patent [19]

Ashton et al.

[11] Patent Number: 4,748,580
[45] Date of Patent: May 31, 1988

[54] MULTI-PRECISION FIXED/FLOATING-POINT PROCESSOR

[75] Inventors: Charles D. Ashton, Campbell; David K. Quong, Sunnyvale, both of Calif.; Alan G. Corry, Boston, Mass.

[73] Assignee: Advanced Micro Devices, Inc., Sunnyvale, Calif.

[21] Appl. No.: 771,385

[22] Filed: Aug. 30, 1985

[51] Int. Cl.⁴ .............................................. G06F 7/48
[52] U.S. Cl. .................................... 364/736; 364/748
[58] Field of Search ............... 364/748, 736, 754, 757, 364/768, 200 MS File

[56] References Cited

U.S. PATENT DOCUMENTS

| | | | |
|---|---|---|---|
| 4,215,416 | 7/1980 | Muramatsu | 364/736 |
| 4,217,657 | 8/1980 | Handly et al. | 364/748 |
| 4,467,444 | 8/1984 | Harmon, Jr. et al. | 364/736 |
| 4,525,776 | 6/1985 | Eldumiati et al. | 364/736 |

*Primary Examiner*—Gary V. Harkcom
*Assistant Examiner*—Tan V. Mai
*Attorney, Agent, or Firm*—Patrick T. King; Warren M. Becker; J. Vincent Tortolano

[57] ABSTRACT

A single-chip fixed/floating-point arithmetic processor, a three port ALU, a plurality of storage registers R, S, F0 and F1, a constant store circuit and an output data register F. Two of the storage registers R and S are provided for storing 64-bit input operands and two of the regusters F0 and F1 are provided for storing 64-bit results of operations performed in the ALU. Each of the registers are provided with three output ports and corresponding pass gates for selectively transferring data from the registers to the three inputs of the ALU under the control of control signals applied to the pass gates. The constant store is also coupled to one of the input ports of the ALU by a pass gate for transferring constants to the ALU under the control of a pass gate. Results of the ALU are provided to the data output register F for further processing off-chip.

9 Claims, 1 Drawing Sheet

MULTI-PRECISION FIXED/FLOATING-POINT PROCESSOR

BACKGROUND OF THE INVENTION

1. Field of the Invention

The present invention relates to fixed/floating-point arithmetic processors in general and to a multi-precision fixed/floating-point arithmetic processor comprising a multiplexed, multiple register data path circuit in particular.

2. Description of Prior Art

Many numerical processing algorithms require the execution of a large variety of fixed and floating-point operations. In many applications the operations are intimately linked with inputs to currently executing operations being derived from data operands computed one or two instructions previously.

When single-chip arithmetic processors are designed for processing the above-described algorithms, there is a need to provide a mechanism to save past results without a transfer off-chip, and to re-use past results saved on-chip. There is hence a requirement for on-chip data feedback and storage of temporary results.

In addition to a requirement for on-chip temporary storage and data feedback, there is also a requirement for providing data not only for single and two operand instructions but also for three operand instructions. For example, in signal processing, many algorithms can be decomposed into multiply/accumulate type instructions $(A \times B) + C$. In data processing, field extraction instructions concatenate two 64-bit fields A, B and extract a 64-bit field beginning at bit position C.

In addition to the desirability of on-chip temporary storage and data feedback and a processor with a capability to selectively execute single, double and triple operand instructions, the execution of numerical processing algorithms, as described above, frequently requires the use of numerical constants in fixed and floating-point formats. For example, certain signal processing algorithms require the scaling of data by a factor of $\frac{1}{2}$ or 2. If the constants $\frac{1}{2}$ or 2 were provided on-chip in fixed and floating-point formats, it would minimize the number of off-chip accesses required to implement the scaling operation in the several formats.

There are currently single-chip floating-point processors comprising on-chip feedback circuits which include temporary storage registers such as, for example, the circuit disclosed in copending patent application Ser. No. 657,563, filed Oct. 3, 1984, entitled A METHOD AND APPARATUS FOR SUMMING PRODUCTS OF PAIRS OF NUMBERS, U.S. Pat. No. 4,692,888, which is assigned to the assignee of the present application.

In the above-identified single-chip processor, there is provided an ALU, a plurality of temporary storage registers, multiple feedback paths for transferring data from the output of the ALU to the input ports of the ALU and an on-chip constant store. As in other known single-chip processors, however, the latter processor has the disadvantages that it is designed around a two port ALU rather than a three port ALU, requires two feedback paths to transfer data from the output of the ALU to the ALU input ports instead of a single feedback path and is not provided with an on-chip source of user selectable numerical constants in both fixed and several floating-point formats. These disadvantages combine to require undesirably large amounts of chip area for implementing a high-speed fixed/floating-point processor and multiple off-chip data accesses in the execution of many three operand instructions and multiple-step operations.

In another prior known single-chip arithmetic processor, there is provided a three port ALU, a plurality of temporary storage registers, a random access memory (RAM) and a single feedback path to the RAM and the registers.

While using a single feedback path, principal disadvantages of the latter processor are that the ALU is not capable of performing floating-point operations and there is no provision for selectively transferring data from more than one of the registers to any one of the ALU input ports.

SUMMARY OF THE INVENTION

In view of the foregoing, a principal object of the present invention is a novel single-chip fixed/floating-point arithmetic processor having a three port arithmetic logic unit (ALU) for processing one, two and three operand instructions, a plurality of four on-chip temporary storage registers for storing operands and results from the ALU, an on-chip dedicated single feedback path for transferring ALU results to two of the registers, an on-chip source of user-selectable numerical constants in a fixed and several floating-point formats and a control circuit.

The outputs of all of the registers are coupled to the three input ports of the ALU by pass gates. The inputs of a first and a second one of the registers are provided for receiving a first and a second operand, respectively. The inputs of a third and a fourth one of the registers are provided for receiving an output of the ALU via the dedicated single feedback path. The output of the constant source is coupled to one of the ALU inputs by a pass gate. The control circuit controls the transfer of data and constants between the constant source, registers and the three ports of the ALU.

In operation, the single feedback path and its associated registers provide the same functionality as prior known two feedback path circuits while reducing the chip area requirements of the prior known circuits.

The on-chip register configuration which provides for the direct availability of three operands to support ALU instructions such as $(A \times B) + C$ and [SHIFT (A,B), C bits] results in an improvement in performance over prior known two port processors. Prior known two port processors required multiple cycles to execute such instructions whereas the apparatus of the present invention is capable of executing such instructions in a single cycle.

The on-chip constant store, which is available for directly providing constants in fixed and floating-point formats during the execution of various algorithms, e.g. Newton-Raphson algorithm for division having the form $A + (2 - B \times A)$ and instructions such as increment/decrement, A/2, 2*A, etc., minimizes off-chip data transfers and the use of on-chip temporary result/data registers.

BRIEF DESCRIPTION OF DRAWING

The above and other objects, features and advantages of the present invention will become apparent from the following detailed description of the accompanying drawing which comprises a block diagram of a single-chip floating-point arithmetic processor according to the present invention.

DESCRIPTION OF THE PREFERRED EMBODIMENT

Figure 1:
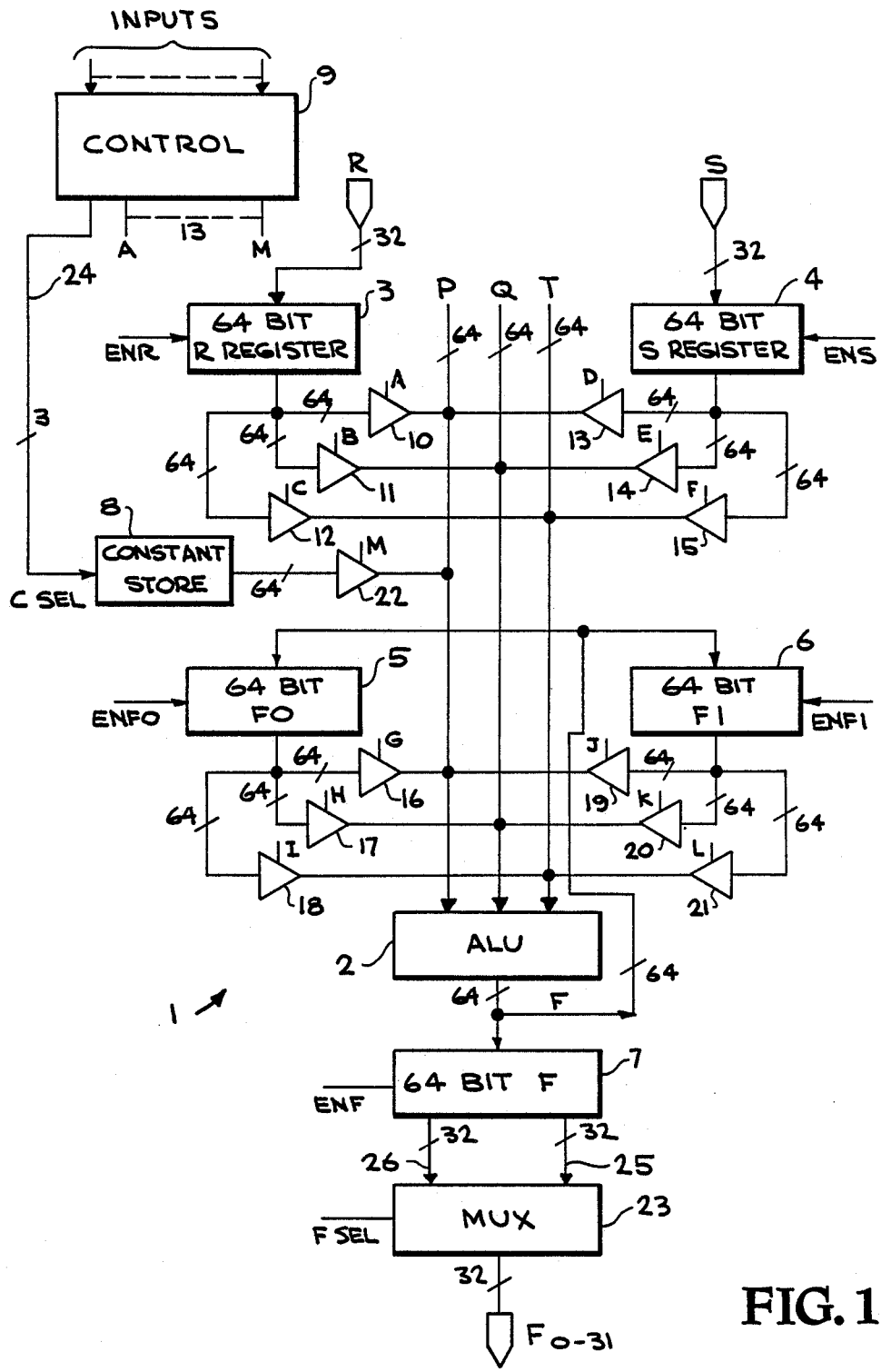

Referring to the drawing, there is provided in accordance with the present invention a single-chip floating-point arithmetic processor designated generally as 1. In the processor 1 there is provided an arithmetic logic unit (ALU) 2, a plurality of 64-bit temporary storage registers 3, 4, 5 and 6, a data output register 7, a user-selectable constant storage register 8 for storing constants in several fixed and floating-point formats, e.g. IEEE, DEC and IBM, a source of control signals 9, a plurality of pass gates 10-22 and a multiplexer circuit 23.

In the ALU 2 there are provided three input ports coupled to a plurality of 64-bit data busses P, Q and T, respectively.

In each of the registers 3-6, which are also designated R, S, F0 and F1, respectively, there is provided an input port, an output port and an enable signal input.

In R register 3, the input port is coupled to a 32-bit data bus designated R. The output port is coupled by means of a 64-bit data bus to the input of the pass gates 10-12, respectively. The outputs of the pass gates 10-12 are coupled to data busses P, Q and T, respectively. The enable signal input of the register 3 is provided for receiving enable signals on a line designated ENR.

In S register 4, the input port is coupled to a 32-bit data bus designated S. The output port of the register 4 is coupled to corresponding inputs of the pass gates 13-15 by 64-bit busses. The outputs of the pass gates 13-15 are coupled to the busses P, Q and T, respectively. The enable signal input of the register 4 is provided for receiving enable signals on a line designated ENS.

The input ports of the F0 and F1 registers 5 and 6 are coupled to the output of the ALU 2 by means of a 64-bit data feedback bus F. The output port of the register 5 is coupled to inputs of the pass gates 16-18 by means of 64-bit busses. The outputs of the pass gates 16-18 are coupled to the input ports of the ALU by means of the busses P, Q and T, respectively. The enable input of the register 5 is coupled to a source of enable signals by means of an enable signal line designated ENF0. The output port of the register 6 is coupled to the inputs of the pass gates 19-21 by means of 64-bit busses. The outputs of the pass gates 19-21 are coupled to the inputs of the ALU 2 by means of the busses P, Q and T. The enable input of the register 6 is coupled to a source of enable signals by means of an enable signal line designated ENF1.

The output of the constant store 8 is coupled to the input of the pass gate 22 by means of a 64-bit bus. The output of the pass gate 22 is coupled to one input of the ALU 2 by means of the bus P. In addition, there is provided in the constant store 8 a constant select input designated CSEL which is coupled to the control signals circuit 9 by means of a 3-bit bus 24.

The control inputs of the pass gates 10-22, which are designated A-M, respectively, are coupled to corresponding outputs of the control signals source 9 by means of corresponding lines designated A-M.

The output of the ALU is coupled to the input port of the data output register 7 by means of the bus F. In addition, the register 7 is provided with an enable signal input coupled to an enable signal input line designated ENF and to the multiplexer 23 by means of a pair of data busses 25 and 26.

In the multiplexer 23 there is provided, in addition to the data inputs coupled to the busses 25 and 26, a select input coupled to a select input line designated FSEL. The output of the multiplexer 23 is coupled to a 32-bit data bus designated $F_{0-31}$.

In operation, two 32-bit or 64-bit operands are provided to each of the R and S registers 3 and 4 by means of the data busses R and S. Thereafter, the operands, in 64-bit blocks, are selectively transferred to inputs of the ALU 2 under the control of the pass gates 10-15. The results of an ALU operation which appear on the data bus F are then transferred into the registers 5, 6 and 7 under the control of enable signals applied to the enable signal lines ENF0, ENF1 and ENF. The results thus stored in the registers 5 and 6 are selectively transferred to the ALU via the busses P, Q and T under the control of the pass gates 16-21. If the operations of the ALU on a particular fixed or floating-point instruction require a constant, the constant in the required format is provided by the constant store 8 via the bus P under the control of control circuit 9 and the pass gate 22. The multiplexer 23 is provided for transferring data from the F register 7 onto the 32-bit bus $F_{0-31}$ under the control of the multiplexer select signal applied to the multiplexer select signal line FSEL.

By means of the present invention, operands from the R and S registers 3 and 4 and the results from the execution of previous instructions which have been stored in the F0 and F1 registers 5 and 6 can be provided to the ALU on any of the busses P, Q and T and constants from the constant source 8 can be provided on at least one of the busses P, Q and T for executing three operand instructions and multiple-step operations during a single machine cycle. For example, an operand from R register 3 can be placed on bus Q, an operand from S register 4 can be placed on bus T and a constant from constant store 8 can be placed on bus P for concurrent use in the ALU 2. The results of the ALU 2's operation on the two operands and the constant can then be stored in the $F_0$ and $F_1$ registers 5 and 6 for use with subsequent operands from the R and S registers 3 and 4 and/or the constant store 8. Alternatively, the operands in the R register 3 and S register 4 could be placed on the busses T and Q, respectively, for use in an operation involving the contents of one of the F0 and F1 registers 5 and 6 which are placed on the P bus.

From the foregoing description it is evident that by means of the present invention a wide variety of data transfers between the registers 3-6, constant source 8 and the ALU 2 are possible by simply applying corresponding inputs to the control signals circuit 9 and the enable inputs of the registers.

While a preferred embodiment of the present invention is disclosed above, it is contemplated that various modifications may be made thereto without departing from the spirit and scope of the invention. For example, while pass gates are described for coupling the outputs of the registers 3, 4, 5 and 6 and constant store 8 to busses P, Q and T, multiplexers and other suitable circuits may be used. Accordingly, it is intended that the disclosed embodiment be considered only as an illustration of the present invention and that the scope of the invention be determined by reference to the claims hreinafter provided.

What is claimed is:

1. A single-chip floating-point arithmetic processor comprising:
   a floating-point arithmetic logic unit having at least three input ports and an output port;
   a first, a second, a third and a fourth storage register, each having at least one input port and at least one output port;
   means for selectively transferring data from each of said output ports of said first, second, third and fourth registers to each of said input ports of said arithmetic logic unit;
   means for transferring data from said output port of said arithmetic logic unit to said input ports of said first and said second storage registers;
   means for coupling said input ports of said third and said fourth storage registers to a source of a first and a second operand, respectively;
   a data output register having an input port; and
   means for transferring data from said output port of said arithmetic logic unit to said input port of said data output register.

2. A processor according to claim 1 comprising:
   means for storing a plurality of numerical constants having at least one output port; and
   means for selectively transferring data from said output port of said constant storing means to at least one of said input ports of said arithmetic logic unit.

3. A processor according to claim 2 wherein said means for selectively transferring data to said input ports of said arithmetic logic unit comprises:
   a plurality of pass gates, each having a control signal input;
   a source of control signals having a plurality of outputs; and
   means for coupling said outputs of said control signals source to said control signal inputs of said pass gates.

4. A processor according to claim 1 comprising means for enabling the loading of data into each of said storage registers.

5. A processor according to claim 1 wherein said means for transferring data from sid arithmetic logic unit to said first and said second storage registers comprises:
   a data bus; and
   means for coupling said data bus to said input ports of said first and said second storage registers.

6. A single-chip floating-point arithmetic processor comprising:
   a floating-point arithmetic logic unit having at least three input ports and an output port;
   a first, a second, a third and a fourth storage register, each having at least one input port and at least one output port;
   means for selectively transferring data from each of said output ports of said first, second, third and fourth registers to each of said input ports of said arithmetic logic unit;
   means for coupling said output port of said arithmetic logic unit to said input ports of said first and said second storage registers;
   means for coupling said input ports of said third and said fourth storage registers to a source of a first and a second operand, respectively;
   means for storing a plurality of numerical constants having at least one output port;
   means for selectively transferring data from said output port of said constant storing means to at least one of said input ports of said arithmetic logic unit;
   a data output register having an input port; and
   means for transferring data from said output port of said arithmetic logic unit to said input port of said data output register.

7. A processor according to claim 6 wherein said means for selectively transferring data to said input ports of said arithmetic logic unit comprises:
   a plurality of pass gates, each having a control signal input;
   a source of control signals having a plurality of outputs; and
   means for coupling said outputs of said control signals source to said control signal inputs of said pass gates.

8. A processor according to claim 6 comprising means for enabling the loading of data into each of said storage registers.

9. A processor according to claim 6 wherein said means for transferring data from said arithmetic logic unit to said first and said second storage registers comprises:
   a data bus; and
   means for coupling said data bus to said input ports of said first and said second storage registers.

* * * * *